(12) United States Patent
Fukushima et al.

(10) Patent No.: US 8,158,215 B2
(45) Date of Patent: Apr. 17, 2012

(54) MAGNETIC RECORDING MEDIA AND METHOD OF MANUFACTURING THE SAME, AND MAGNETIC RECORDING/REPRODUCTION DEVICE

(75) Inventors: Masato Fukushima, Ichihara (JP); Akira Sakawaki, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/441,770

(22) PCT Filed: Aug. 16, 2007

(86) PCT No.: PCT/JP2007/065947
§ 371 (c)(1),
(2), (4) Date: Mar. 18, 2009

(87) PCT Pub. No.: WO2008/035520
PCT Pub. Date: Mar. 27, 2008

(65) Prior Publication Data
US 2009/0237838 A1    Sep. 24, 2009

(30) Foreign Application Priority Data
Sep. 21, 2006  (JP) .................................. 2006-255815

(51) Int. Cl.
*G11B 5/00*        (2006.01)
*G11B 5/74*        (2006.01)
(52) U.S. Cl. ........ 427/523; 427/127; 427/131; 360/110; 360/131
(58) Field of Classification Search .................. 427/523, 427/127, 131; 360/110, 131
See application file for complete search history.

(56) References Cited

U.S. PATENT DOCUMENTS

| 4,451,500 | A | * | 5/1984 | Gerard et al. | .................. | 427/531 |
| 4,460,412 | A | * | 7/1984 | Imura et al. | .................... | 427/530 |
| 4,476,152 | A | * | 10/1984 | Imura et al. | .................... | 427/526 |
| 4,584,668 | A | * | 4/1986 | Takeuchi et al. | ................ | 365/36 |

(Continued)

FOREIGN PATENT DOCUMENTS
JP       05-205257 A       8/1993
(Continued)

OTHER PUBLICATIONS

Edi Suharyadi, et al., "Fabrication of Patterned Co/Pd Nanostructures Using E-Beam Lithography and Ga Ion-Irradiation", The Institute of Electronics, Information and Communication Engineers, IEICE Technical Report, MR2005-55, Feb. 2006, pp. 21-26.

(Continued)

*Primary Examiner* — Timothy H Meeks
*Assistant Examiner* — Mandy Louie
(74) *Attorney, Agent, or Firm* — Sughrue Mion, PLLC

(57) ABSTRACT

A method of manufacturing magnetic recording media with a high areal recording density, in which there write bleeding during magnetic recording is eliminated by reducing insofar as possible the coercive force and remanent magnetization in areas between magnetic tracks, is provided. The method of manufacture can produce magnetic recording media 10, in which a magnetic layer 3 is provided on at least one surface of a nonmagnetic substrate 1, and a magnetically separated magnetic pattern 3a is formed in this magnetic layer 3; by implanting atoms into the magnetic layer 3 with a uniform distribution in the thickness direction of the magnetic layer 3, and partially rendering nonmagnetic the magnetic layer 3, nonmagnetic portions 5 which magnetically separate the magnetic pattern 3a are formed.

4 Claims, 2 Drawing Sheets

U.S. PATENT DOCUMENTS

| | | | |
|---|---|---|---|
| 4,642,270 A * | 2/1987 | Morita et al. | 428/621 |
| 4,701,385 A * | 10/1987 | Imura et al. | 365/33 |
| 4,772,976 A * | 9/1988 | Otomo et al. | 360/125.01 |
| 5,599,590 A * | 2/1997 | Hayashi et al. | 427/448 |
| 6,331,364 B1 | 12/2001 | Baglin et al. | |
| 6,753,043 B1 * | 6/2004 | Kuo et al. | 427/526 |
| 2002/0142192 A1 | 10/2002 | Kamata et al. | |
| 2003/0180576 A1 | 9/2003 | Nakamura et al. | |
| 2003/0193735 A1 * | 10/2003 | Kuo et al. | 360/77.03 |
| 2004/0091748 A1 | 5/2004 | Kamata et al. | |
| 2004/0101713 A1 | 5/2004 | Wachenschwanz et al. | |
| 2004/0191557 A1 | 9/2004 | Kamata et al. | |
| 2004/0258833 A1 * | 12/2004 | Kamata et al. | 427/130 |
| 2005/0036223 A1 | 2/2005 | Wachenschwanz et al. | |
| 2005/0170212 A1 * | 8/2005 | Albrecht et al. | 428/694 T |
| 2009/0323219 A1 | 12/2009 | Fukushima et al. | |

FOREIGN PATENT DOCUMENTS

| | | |
|---|---|---|
| JP | 07-141641 A | 6/1995 |
| JP | 2001-134929 A | 5/2001 |
| JP | 2002-288813 A | 10/2002 |
| JP | 2002-359138 A | 12/2002 |
| JP | 2003203332 A | 7/2003 |
| JP | 2004-164692 A | 6/2004 |
| JP | 2004-178793 A | 6/2004 |
| JP | 2004-178794 A | 6/2004 |
| JP | 2005-158095 A | 6/2005 |
| JP | 2006-099948 A | 4/2006 |
| JP | 2007273067 A | 10/2007 |

OTHER PUBLICATIONS

Japanese Office Action corresponding to Japanese Patent Application No. 2006-255815 dated Jan. 12, 2010.

* cited by examiner

MAGNETIC RECORDING MEDIA AND METHOD OF MANUFACTURING THE SAME, AND MAGNETIC RECORDING/REPRODUCTION DEVICE

BACKGROUND OF THE INVENTION

1. Field of the Invention

This invention relates to magnetic recording media used in hard disk devices and similar and to a method of manufacture of such media, as well as to a magnetic recording/reproduction device.

2. Description of the Related Art

In recent years there has been a remarkable expansion of the range of application of magnetic disk devices, flexible disk devices, magnetic tape devices, and other magnetic recording devices, and the increasing importance of such devices has been accompanied by progress to markedly increase the recording densities of the magnetic recording media used in such magnetic recording devices. In particular, since the introduction of MR heads and PRML technology, areal recording densities have surged upward, and with the further appearance of GMR heads, TMR heads and other technologies in recent years, areal recording densities have continued to shoot upward at a rate of roughly 100% per year.

Hence the attainment of still higher recording densities for magnetic recording media is being sought, and to this end magnetic recording layers with higher coercive forces, higher signal-to-noise ratios (SNRs), and higher resolution are demanded. Also, in recent years continuing efforts have been made to further increase areal recording densities through increases in track densities together with improvements in linear recording densities.

In the most recent magnetic recording devices, track densities of 110 kTPI have been achieved. However, if track densities are increased, mutual interference of magnetic recorded information in adjacent tracks occurs, and magnetization transition regions in these boundary areas become a source of noise, so that the problem that the SNR is degraded tends to occur. This leads directly to a reduced bit error rate, and so impedes increases in recording density.

In order to further increase areal recording densities, the size of each recorded bit on the magnetic recording media must be made still more minute, and as large a saturation magnetization and magnetic film thickness as possible must be secured for each recorded bit. However, if recorded bits are further reduced in size, the minimum magnetized volume per bit is decreased, and so there is the problem that magnetization inversion due to thermal fluctuation causes loss of recorded data.

Moreover, because the distance between tracks is decreased, extremely high-precision track servo technology is required in magnetic recording devices, and at the same time, a method is generally employed in which recording is executed with a wide width, and reproduction is executed over a width narrower than during recording in order to eliminate insofar as possible the effect of adjacent tracks. In this method, the effects of other tracks can be suppressed to a minimum, but on the other hand it is difficult to obtain an adequate reproduction output, and consequently there is the problem that an adequate SNR cannot easily be secured.

As one method of addressing such problems with thermal fluctuations, and of securing an adequate SNR and sufficient output, attempts have been made to raise the track density by forming depressions and protrusions along tracks on the recording media surface, to physically separate recording tracks from each other. (Below, such technology is called the discrete track method, and magnetic recording media manufactured using this method is called discrete track media.)

As one example of discrete track media, magnetic recording media is known in which the magnetic recording media is formed on a nonmagnetic substrate on the surface of which a pattern of depressions and protrusions has been formed, so that physically separated magnetic recording tracks and servo signal patterns are formed (see Patent Reference 1).

In this magnetic recording media, a ferromagnetic layer is formed on top of the nonmagnetic substrate having a plurality of depressions and protrusions on the surface, with a soft magnetic layer intervening. In this magnetic recording media, magnetic recording areas, physically separated from the surrounding areas, are formed in protrusion areas.

By means of this magnetic recording media, the occurrence of domain walls in the soft magnetic layer can be suppressed, so that the effects of thermal fluctuations tend not to appear, nor is there interference between adjacent signals, and high-density magnetic recording media with low noise can be fabricated.

Discrete track methods include a method in which tracks are formed after magnetic recording media comprising a number of thin film layers is fabricated, and a method in which, after forming a depression/protrusion pattern either directly on the substrate surface in advance or else in a thin film layer for track formation, magnetic recording media thin film layers are formed (see for example Patent Reference 2 and Patent Reference 3).

Of these, the former method, often called the magnetic layer machining method, entails physical machining of the surface after media fabrication, and so has the drawback that contamination tends to occur during media manufacturing processes, and moreover manufacturing processes are extremely complicated. On the other hand, the latter method is often called the embossing method; contamination does not readily occur during manufacturing processes, but because the depression/protrusion shape formed on the substrate is transferred to film deposited thereupon, there are the problems that the flying attitude and flying height of a recording/reproduction head which performs recording or reproduction while flying over the media are unstable.

In addition, a method has also been disclosed in which areas between magnetic tracks in discrete track media are formed by implantation of nitrogen ions and oxygen ions into the magnetic layer in advance, and then performing laser irradiation (see Patent Reference 4). However, the areas between magnetic tracks formed using this method, while having a low saturation magnetization, have a high coercive force, so that a state of insufficient magnetization occurs, and when writing information in the magnetic track portions, write bleeding occurs.

Further, methods have been disclosed in which, in so-called patterned media manufacturing in which a magnetic recording pattern is positioned with a constant regularity at each bit, the magnetic recording pattern is etched by ion irradiation, or the magnetic layer is formed by amorphization (see Non-patent Reference 1 and Patent Reference 5). However, in this method also, there are problems such as the occurrence of contamination of the magnetic recording media in manufacturing processes and reduced smoothness of the surface, as well as such problems as inadequate elimination of magnetization in the magnetic layer by the ion irradiation.

Patent Reference 1: Japanese Unexamined Patent Application No. 2004-164692

Patent Reference 2: Japanese Unexamined Patent Application No. 2004-178793

Patent Reference 3: Japanese Unexamined Patent Application No. 2004-178794
Patent Reference 4: Japanese Unexamined Patent Application No. 5-205257
Patent Reference 5: U.S. Pat. No. 6,331,364
Non-patent Reference 1: IEICE Technical Report, MR2005-55 (2006-02), pp. 21-26 (The Institute of Electronics, Information and Communication Engineers)

In the embossing method of manufacturing, depression/protrusion shapes are formed in the substrate, and magnetic layers and a protective layer are formed thereupon, so that the depression/protrusion shapes are transferred without modification to the surface, and it is not easy to realize a flat surface.

On the other hand, in the case of discrete track magnetic recording media prepared using the magnetic layer machining method, a magnetic layer for recording is formed on the substrate surface, and thereafter magnetic patterns are formed. Consequently after magnetic patterns have been formed by an imprint method, used in semiconductors and other fields, the portion which is to serve as a nonmagnetic portion, is subjected to for example dry etching and burying with $SiO_2$ and carbon nonmagnetic material or similar are performed to flatten the surface, and the surface is then covered with a protective film layer, after which a lubricating layer is formed. Such magnetic etched-type discrete track media entails complicated manufacturing processes, and not only may be the source of contamination, but cannot attain a flat surface.

In general in magnetic recording media with such a structure, the thinner the protective film layer, the shorter is the distance between head and magnetic layer, so that signal entry into and exit from the head is greater, and higher recording densities are possible. Also, the pit density within tracks is determined by the flying height of the head traveling over the protective film layer surface, with a depression/protrusion shape. Hence preservation of stable head flight while achieving high recording densities is a vital problem. To this end, a depression/protrusion pattern is sought which brings the head into as close proximity to the magnetic layer as possible while maintaining stable head flight, and yet which prevents mutual interference between signals of adjacent tracks.

However, there have been no proposals of manufacturing technology for discrete track media with a flat surface, and which poses no risk of contamination in manufacturing processes, nor have there been proposals of technology for the manufacture of magnetic recording media in which write bleeding does not occur when writing information to the magnetic track portions.

In the manufacture of so-called patterned media, it has been proposed that the magnetic layer be amorphized by ion irradiation to form the magnetic recording patterns; however, there have been the problems that elimination of magnetic properties in the magnetic layer is inadequate, and that write bleeding occurs. This is thought to occur because, although magnetic layer crystals are temporarily amorphized by ions implanted into the magnetic layer, in subsequent processes, and due to the heat at the time of ion irradiation, a portion of the amorphous structure is recrystallized, and as a result there is recovery of the magnetic characteristics of the magnetic layer subjected to ion irradiation.

This invention was devised in light of the above circumstances of the prior art, and has, as an object, the provision, for magnetic recording devices, engineering difficulties in respect to which are being faced as recording densities rise, of magnetic recording media in which, while maintaining recording/reproduction characteristics comparable or superior to those of the prior art, enables higher recording densities, and reduces to the utmost the coercive force and remanent magnetization of the nonmagnetic portions which magnetically separate magnetic patterns, to eliminate write bleeding in the event of magnetic recording, and to thereby enable increases in the areal recording density, as well as the provision of a manufacturing method for such media, and a magnetic recording/reproduction device.

In particular, this invention has as an object the provision, for discrete track magnetic recording devices in which depressions and protrusions are formed after depositing a magnetic layer on a nonmagnetic substrate, of magnetic recording media with simplified manufacturing processes, and with low risk of contamination, and with excellent head flying characteristics, compared with magnetic layer machining methods of the prior art, through the elimination of processes for removal of the magnetic layer, as well as a method of manufacture of such media, and a magnetic recording/reproduction device.

Means to Solve the Problems

As a result of repeated earnest studies with the intention of resolving the above problems, these inventors perfected the present invention.

SUMMARY OF THE INVENTION

This invention provides the following means.

(1) A method of manufacturing magnetic recording media in which a magnetic layer is provided on at least one surface of a nonmagnetic substrate and a magnetically separated magnetic pattern is formed in the magnetic layer, characterized in that atoms are implanted, with uniform distribution in the magnetic layer thickness direction, in the magnetic layer, and the magnetic layer is rendered partially nonmagnetic, so that nonmagnetic portions are formed which magnetically separate the magnetic pattern.

(2) The method of manufacturing magnetic recording media described in (1) above, characterized in that the magnetic layer comprises Co, and that the Co (002) or Co (110) X-ray diffraction peak intensity of the nonmagnetic portion is ½ or less.

(3) The method of manufacturing magnetic recording media described in (1) above, characterized in that the nonmagnetic portion is amorphized.

(4) The method of manufacturing magnetic recording media described in any one of (1) through (3) above, characterized in that a distribution is imparted to the energy of atoms implanted into the magnetic layer.

(5) The method of manufacturing magnetic recording media described in any one of (1) through (3) above, characterized in that two or more types of atoms are implanted into the magnetic layer.

(6) The method of manufacturing magnetic recording media described in any one of (1) through (5) above, characterized in that the atoms are one or more type selected from the group consisting of B, P, Si, F, N, H, C, In, Bi, Kr, Ar, Xe, W, As, Ge, Mo, and Sn.

(7) The method of manufacturing magnetic recording media described in any one of (1) through (5) above, characterized in that the atoms are Kr or Si.

(8) The method of manufacturing magnetic recording media described in any one among (1) through (5) above, characterized in that the surface roughness of the nonmagnetic substrate is such that the center line average roughness Ra is within the range $0.1\ nm \leq Ra \leq 2.0\ nm$.

(9) The method of manufacturing magnetic recording media described in any one among (1) through (8) above, characterized in that, after forming a protective film layer on the magnetic layer, the atoms are implanted.

(10) Magnetic recording media, in which a magnetic layer is provided on at least one surface of a nonmagnetic substrate, and a magnetically separated magnetic pattern is formed in the magnetic layer, characterized in that it comprises a nonmagnetic portion which magnetically separates the magnetic pattern, and in that this nonmagnetic portion is formed by implanting atoms into the magnetic layer with a uniform distribution in the magnetic layer thickness direction, to render the magnetic layer partially nonmagnetic.

(11) The magnetic recording media described in (10) above, characterized in that the magnetic layer comprises Co, and that the Co (002) or Co (110) X-ray diffraction peak intensity of the nonmagnetic portion is ½ or less.

(12) The magnetic recording media described in (10) above, characterized in that the nonmagnetic portion is amorphized.

(13) The magnetic recording media described in (10) above, characterized in that the magnetic pattern is a recording track pattern or a servo signal pattern.

(14) The magnetic recording media described in (10) above, characterized in that the magnetic layer is a perpendicular magnetic layer.

(15) A magnetic recording/reproduction device, characterized in that it comprises the magnetic recording media described in any one of (10) through (14) above, and a magnetic head which performs recording and reproduction of information onto and from the magnetic recording media.

EXPLANATION OF SYMBOLS

Figure 1:
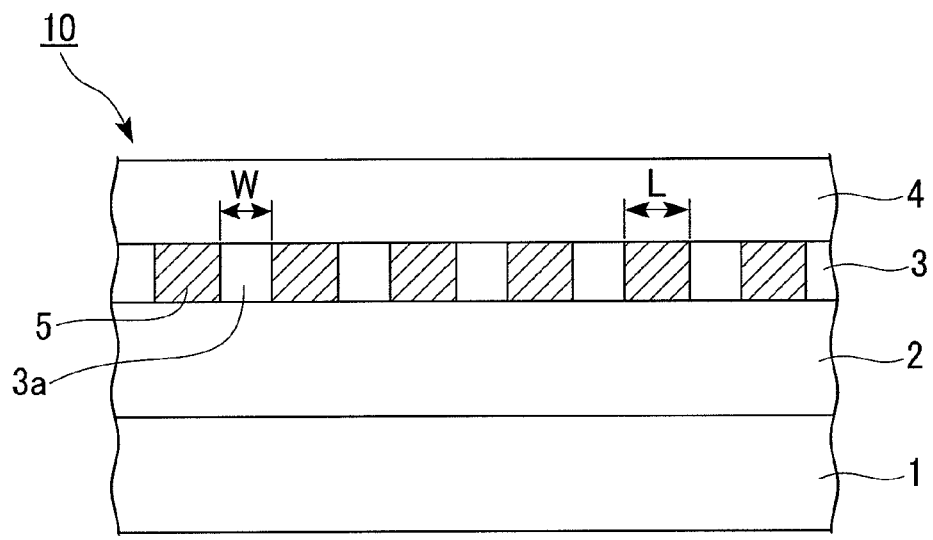
FIG. 1 is a cross-sectional view showing an example of magnetic recording media to which this invention is applied.

1 Nonmagnetic substrate
2 Soft magnetic layer and intermediate layer
3 Magnetic layer
3a Magnetic pattern
4 Protective layer
5 Nonmagnetic portion
10 Magnetic recording media
11 Media driving portion
12 Magnetic head
13 Head driving portion
14 Recording/reproduction signal system
20 Magnetic recording/reproduction device

DETAILED DESCRIPTION OF THE PREFERRED EMBODIMENTS

As described above, by means of this invention, magnetic recording media can be provided such that head flight stability can be secured, having excellent magnetic pattern separation, which is not affected by signal interference between adjacent magnetic patterns, and which has excellent high-density recording characteristics.

Further, by means of this invention, a method of manufacturing magnetic recording media can be provided which enables elimination of the track etching process to remove a magnetic layer in magnetic layer machining methods, which in the prior art has been regarded as requiring extremely complicated manufacturing processes, and so contributes to greatly improved productivity.

Further, by means of this invention, a magnetic recording/reproduction device can be provided which, by using magnetic recording media affording excellent head flight characteristics and excellent separation of magnetic patterns, enables excellent high-density recording characteristics, with no write bleeding or effects of signal interference between adjacent magnetic patterns.

Below, aspects of this invention are explained in detail, referring to the drawings.

This invention is characterized in that, when manufacturing magnetic recording media in which a magnetic layer is provided on at least one surface of a nonmagnetic substrate, and a magnetically separated magnetic pattern is formed in this magnetic layer, atoms are implanted into the magnetic layer with a uniform distribution in the magnetic layer thickness direction, and by rendering partially nonmagnetic this magnetic layer, magnetic portions which materially separate the magnetic pattern are formed.

A method of manufacturing magnetic recording media of this invention differs from manufacturing methods of the prior art in that, at the time of formation of the magnetically separated magnetic pattern in the magnetic layer, there is no process, such as dry etching or stamping, for physically separating the magnetic pattern.

As the magnetic pattern in magnetic recording media to which this invention is applied, the pattern of so-called patterned media, in which a magnetic recording pattern is positioned with fixed regularity at each bit, as well as the pattern of media in which the recording track pattern is positioned in the track shape, and the pattern of media comprising a servo signal pattern, can be used. Of these, it is preferable that this invention be applied to so-called discrete magnetic recording media, comprising a recording track pattern and servo signal pattern as the magnetic pattern, in consideration of the ease of manufacture.

Below, this invention is explained using an example of application to discrete type magnetic recording media 30.

FIG. 1 is a cross-sectional view showing the structure of discrete type magnetic recording media 30 to which the invention is applied.

This magnetic recording media 30 has, deposited in order on the surface of the nonmagnetic substrate 1, a soft magnetic layer and intermediate layer 2, magnetic layer 3, and protective layer 4. In the magnetic layer 3 are provided a plurality of magnetic patterns 3a, serving as the above-described recording track pattern and servo signal pattern; these magnetic patterns 3a are magnetically separated by nonmagnetic portions 5 therebetween.

In order to raise the recording density, it is preferable that in the magnetic layer 3 the width W of the magnetic pattern 3a be 200 nm or less, and that the width L of the nonmagnetic portions 5 be 100 nm or less. Hence the track pitch P (=W+L) is in the range 300 nm or less, and in order to raise the recording density, this track pitch P must be made as small as possible.

As the nonmagnetic substrate 1, for example an Al alloy substrate such as Al—Mg alloy or other alloy the main component of which is Al, as well as substrates of ordinary soda glass, aluminosilicate glass, crystallized glass, silicon, titanium, ceramics, or various resins, can be freely used; of these, it is preferable that Al alloy substrates, crystallized glass or other glass substrates, or silicon substrates be used.

It is preferable that the surface roughness of the nonmagnetic substrate 1 be such that the center line average roughness (Ra) is in the range $0.1 \text{ nm} \leq Ra \leq 2.0 \text{ nm}$, more preferable that Ra be 1 nm or less, and still more preferable that Ra be 0.5 nm or less.

It is preferable that the magnetic layer 3 be formed from an alloy the main component of which is Co. Also, in order to realize higher recording densities, it is preferable that the magnetic layer 3 be a perpendicular magnetic recording layer.

As the perpendicular magnetic recording media layers, for example, FeCoB, FeCoSiB, FeCoZr, FeCoZrB, FeCoZrBCu, or another soft magnetic FeCo alloy, or FeTaN, FeTaC, or another FeTa alloy, or CoTaZr, CoZrNB, CoB, or another Co alloy, as a backing layer; an orientation control layer comprising Pt, Pd, NiCr, NiFeCr, or similar; when necessary, an intermediate film comprising Ru or similar; and a magnetic layer comprising 60Co-15Cr-15Pt alloy, 70Co-5Cr-15Pt-10SiO$_2$ alloy, or similar, may be layered and used.

On the other hand, the magnetic layer 3 may be an in-plane magnetic recording layer. As in-plane magnetic recording layers, for example, a nonmagnetic CrMo underlayer and a ferromagnetic CoCrPtTa magnetic layer can be layered and used.

The magnetic layer 3 may be formed such that adequate head input/output can be obtained, according to the type of magnetic alloy used and the layered structure. Normally, the magnetic layer 3 is formed by a sputtering method as a thin film. Moreover, in order to obtain a constant output or greater during reproduction, the magnetic layer 3 must be of at least a certain thickness, while on the other hand various parameters representing read/write characteristics normally decline with increasing output; hence an optimum film thickness must be set. Specifically, it is preferable that the thickness of the magnetic layer 3 be 3 nm or greater and 20 nm or less, and still more preferable that the thickness be in the range equal to or greater than 5 nm and equal to or less than 15 nm.

The protective layer 4 can for example use carbon (C), a hydrocarbon (H$_x$C), a carbon nitride (CN), amorphous carbon, a silicon carbide (SiC), or another carbon-like layer, as well as SiO$_2$, Zr$_2$O$_3$, TiN, or another normally used material. The protective layer 4 normally is formed by a sputtering method or a CVD method. The protective layer 4 may comprise two or more stacked layers.

It is preferable that the thickness of the protective layer 4 be less than 10 nm. If the thickness of the protective layer 4 exceeds 10 nm, then the distance between the flying head and the magnetic layer 3 becomes large, and adequate input/output signal intensity is not obtained.

Further, it is preferable that a lubricant layer be formed on the protective layer 4. The lubricant layer may for example be formed using a fluoride lubricant, a hydrocarbon lubricant, or a mixture of these, or similar, normally to a thickness of 1 to 4 nm.

In this invention, atoms are implanted into the magnetic layer 3 with a uniform distribution in the direction of the thickness of the magnetic layer 3, to partially render the magnetic layer 3 nonmagnetic; by this means, nonmagnetic portions 5 which magnetically separate the magnetic pattern 3a are formed.

As the atoms for implantation into the magnetic layer 3, it is preferable that one or more types be selected from, for example, a group consisting of B, P, Si, F, N, H, C, In, Bi, Kr, Ar, Xe, W, As, Ge, Mo, and Sn; it is more preferable that one or more types be selected from a group consisting of B, P, Si, F, N, H, and C, or that one or more types be selected from a group consisting of Si, In, Ge, Bi, Kr, Xe, and W; and it is still more preferable that the atoms be Si or Kr. Or, two or more types of these atoms may be implanted.

These atoms can for example be implanted into the portion of the magnetic layer 3 which is to become the nonmagnetic portion 5, using for example an ion beam method or similar. In the ion beam method, the atoms are ionized in order to accelerate the atoms, but the ions implanted into the magnetic layer 3 are thought to be neutralized within the magnetic layer 3.

Although ions implanted into the magnetic layer 3 temporarily amorphize the crystal structure of the magnetic layer 3, in subsequent processes, or due to the heat at the time of ion irradiation, a portion of the amorphous structure is recrystallized, and as a result, the magnetic characteristics of the magnetic layer 3 which has been ion irradiated may recover. In order to resolve this problem, in the present invention, the atoms implanted into the magnetic layer 3 are caused to be distributed uniformly in the thickness direction of the magnetic layer 3. By this means, strain is introduced into the magnetic layer 3, and recrystallization of the amorphized magnetic layer 3 is prevented.

Here, uniformly distributing the atoms in the thickness direction of the magnetic layer 3 means causing the scattering in the concentration of implanted atoms in the thickness direction of the magnetic layer 3 to be small. Specifically, it is preferable that the ratio of the maximum concentration to the average value of the concentration of atoms implanted into the magnetic layer 3 be within 150%, more preferable that the ratio be within 130%, and still more preferable that the ratio be within 110%. Scattering in the concentration of atoms implanted into a magnetic layer 3 can be measured by sputtering Auger spectroscopy, SIMS, or other techniques.

As methods for uniformly distributing atoms implanted into the magnetic layer 3 in the thickness direction of the magnetic layer 3, there exist the following methods (1) through (3).

(1) Impart a distribution to the implantation depth of atoms at the time of implantation of atoms into the magnetic layer 3.
(2) Impart a distribution to the energies of the atoms at the time of implantation of atoms into the magnetic layer 3.
(3) Use a plurality of different types of atoms at the time of implantation of atoms into the magnetic layer 3.

As specific methods for (1) and (2) above, when for example the ions to be implanted are Ar ions, the Ar atoms are ionized to different valences, such as $Ar^+$, $Ar^{2+}$, $Ar^{3+}$. By this means, an implantation depth distribution is imparted to the atoms, and a distribution can be imparted to the energies of the atoms. Or, by using a plurality of ion guns, the energies of implanted ions can be given a distribution. With respect to specific methods for (3), for example, a plurality of different types of ions (with different atomic weights), such as $Ar^+$, $Kr^+$, $Xe^+$, and similar are used as implantation ions. By this means, a distribution can be imparted to the atom implantation depth, or a distribution can be imparted to the energies of the atoms. Also, the implantation depths of atoms can be set appropriately through the accelerating voltage of the ion implantation equipment.

In this invention, by using such methods to manufacture discrete track type magnetic recording media 10, magnetic recording media can be provided which has a high areal recording density, and in which write bleeding is eliminated during magnetic recording, by reducing insofar as possible the coercive force and remanent magnetization in areas between magnetic tracks.

Further, in this invention, it is preferable that the magnetic layer 3 comprise Co, and moreover that the Co (002) or Co (110) X-ray diffraction peak intensity of the nonmagnetic portion be ½ or less.

Here, the Co (002) peak is the main peak for a perpendicular magnetic recording layer, and the Co (110) peak is the main peak for an in-plane magnetic recording layer. For example, "the Co (002) peak for a perpendicular magnetic recording layer" indicates the peak due to Co (002) appearing near $2\theta=42.6°$ in the X-ray diffraction diagram.

Hence by means of this invention, magnetic recording media can be provided which affords a high areal recording density and eliminates write bleeding at the time of magnetic recording, by reducing insofar as possible the coercive force and remanent magnetization in the areas between magnetic tracks.

Further, in this invention, it is preferable that the nonmagnetic portions 5 be amorphized.

Here, to amorphize the magnetic layer 3 means to render the atomic arrangement in the magnetic layer 3 into an irregular atomic ordered state having no long-distance order. More specifically, the term refers to a state in which minute crystal grains of size less than 2 nm are randomly arranged. When using analytic methods to confirm this state of atomic arrangement, X-ray diffraction or electron beam diffraction does not yield peaks indicating crystal planes, and only halos are observed.

Hence by means of this invention, magnetic recording media can be provided which affords a high areal recording density and eliminates write bleeding at the time of magnetic recording, by reducing insofar as possible the coercive force and remanent magnetization in the areas between magnetic tracks.

When as the atoms implanted O or N is used, as described in the above-mentioned Patent Reference 4, because of the small atomic radii of O and N, the effect of implantation is small, and a magnetization state remains in the nonmagnetic portions 5. Also, when using O or N as the implanted atoms, the magnetic layer 3 is nitrified or oxidized, so that the coercive force of the nonmagnetic portions 5 rises, and write bleeding occurs during magnetic recording. That is, when using these atoms, it is not possible to render the magnetic layer 3 nonmagnetic, or reduce the Co (002) or Co (110) peaks of the magnetic layer 3, or amorphize the magnetic layer 3, as in the case of the implanted atoms in this invention.

In this invention, it is preferable that implantation of atoms into the magnetic layer 3 be performed after forming the protective layer 4 on the magnetic layer 3.

By adopting such a process, after atom implantation has been performed, there is no need to form a protective layer 4, manufacturing processes are simplified, and such advantageous results as improved productivity and reduction of contamination in processes to manufacture the magnetic recording media can be obtained.

In this invention, the process of implanting atoms into the magnetic layer 3 may be performed after formation of the magnetic layer 3, or before formation of the protective layer 4. In this case also, nonmagnetic portions can be formed which magnetically separate the magnetic recording tracks, servo signal patterns, and other magnetic patterns 3.

Below, an example is explained of a case in which, after providing the protective layer 4 on the surface of the magnetic layer 3, a recording track pattern and a servo signal pattern, which are magnetic patterns 3a magnetically separated in the magnetic layer 3, are formed.

In this example, after for example depositing as the magnetic layer 3 an alloy of 70Co-5Cr-15Pt-10SiO$_2$, a carbon film is deposited as the protective layer 4. Then, a resist is applied to the surface of the protective layer 4, and a photolithography technique is used to form a patterned mask in a shape corresponding to the recording track pattern and servo signal pattern. Next, an ion beam method or similar is used to implant the atoms into the surface, so that atoms are implanted only into the portions exposed by the mask, which are to become nonmagnetic portions 5. By this means, nonmagnetic portions 5 are formed in which the magnetic layer 3 is rendered partially nonmagnetic, and in addition magnetic recording track and servo signal patterns, magnetically separated in the magnetic layer 3, are formed. Thereafter, the mask is removed, and after again forming the protective layer 5, a lubricant is applied, to complete manufacture of the magnetic recording media.

In this invention, track-shaped depressions and protrusions may be formed on the surface of the protective layer 5 by directly bringing a stamper into close contact with the protective layer 5 and pressing under high pressure. Or, a thermosetting resin, UV-hardening resin, or similar may be used to form a depression/protrusion pattern.

In this case, as the stamper, for example, a metal plate on which a fine track pattern has been formed by electron beam tracing or another method can be used. As the stamper material, any material with sufficient hardness and durability to withstand the above-described process may be used; for example, Ni or similar can be employed. In addition to tracks used to record ordinary data, servo signal patterns, such as burst patterns, gray code patterns, preamble patterns, and similar, can also be formed on the stamper.

In resist removal, dry etching, reactive ion etching, ion milling, or another method may be used to remove the surface resist and a portion of the protective layer. As a result of these processes, a magnetic layer 3, in which a magnetic pattern 3a has been formed, and a portion of the protective layer 5 remain. Also, by selecting conditions appropriately, the entire protective layer 4 can be removed, leaving only the magnetic layer 3 in which is formed the magnetic pattern 3a.

It is possible to form the different layers of the magnetic recording media, other than the protective film layer 4, using RF sputtering, DC sputtering, or other methods as general film deposition methods. On the other hand, to form the protective layer 4, in general a method is employed in which P-CVD or similar is used to deposit a thin film of DLC (Diamond-Like Carbon); however, formation is not limited to this method in particular.

Next, a magnetic recording/reproduction device to which the invention is applied is explained.

Figure 2:
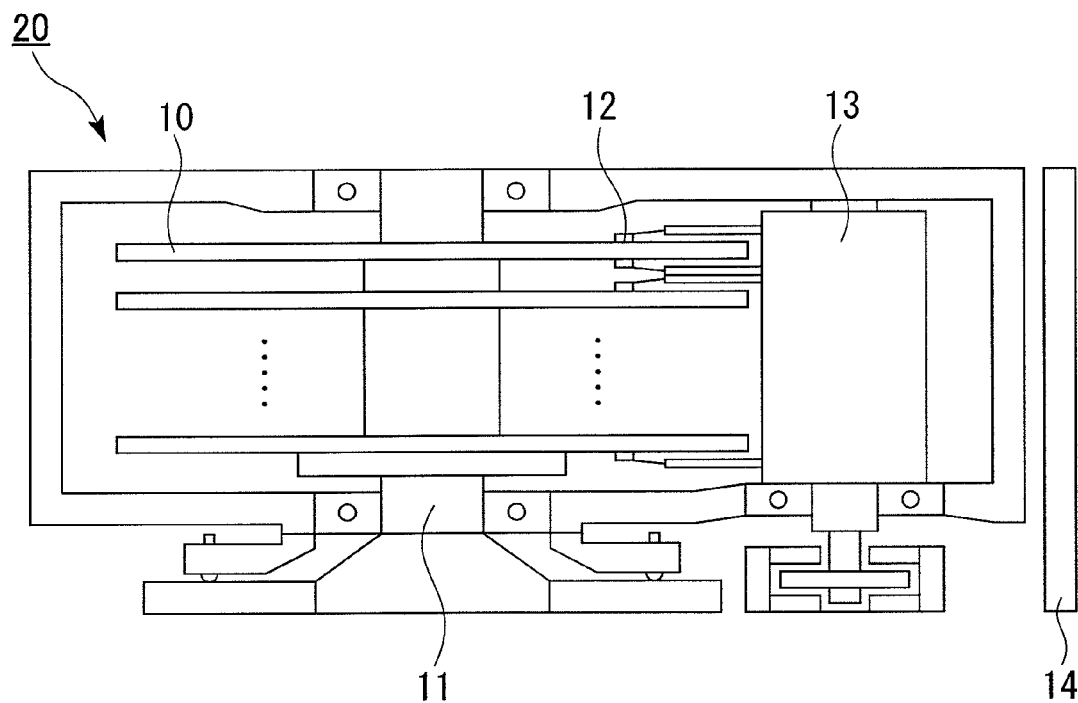
FIG. 2 is a cross-sectional view showing an example of a magnetic recording/reproduction device to which this invention is applied.

FIG. 2 is a side view showing the structure of a magnetic recording/reproduction device 20 to which the invention is applied.

This magnetic recording/reproduction device 20 comprises magnetic recording media (a magnetic disk) 1 to which the invention is applied; a media driving portion 11, which drives (rotates) the media in the recording direction; a magnetic head 12, comprising a recording portion and a reproduction portion; a head driving portion 13, which moves the magnetic head 12 relative to (in the radial direction of) the magnetic recording media 10; and a recording/reproduction signal system 14, which combines recording/reproduction signal processing means to input signals to the magnetic head 12 and perform reproduction of signals output from the magnetic head 12.

In this invention, by combining these portions, a magnetic recording device 20 with high recording density can be configured.

Further, whereas in the prior art the reproduction head width was made narrower than the recording head width in order to exclude the influence of the magnetization transition areas at the track edge portions, by modifying the recording tracks of the magnetic recording media 10 so as to be magnetically discontinuous, it is possible to operate the device with the two made substantially the same width. By this means, an adequate reproduction output and high SNR can be obtained.

Further, by using a GMR head or TMR head in the reproduction portion of the magnetic head 12, an adequate signal intensity can be obtained even at high recording densities, and a magnetic recording/reproduction device 20 capable of high-density recording can be realized.

Further, if the flying height of the magnetic head is made lower, at 0.005 μm to 0.020 μm, than in the prior art, then the output is improved and a high device SNR is obtained, and a high-capacity and highly reliable magnetic recording/reproduction device 20 can be provided.

Further, if signal processing circuitry using a maximum-likelihood method is incorporated, then recording densities can be raised even further; for example, an adequate SNR is obtained even when recording and reproducing data at a track density of 100 ktracks/inch or higher, a linear recording density of 1000 kbits/inch or higher, and an areal recording density of 100 Gbits per square inch or higher.

Below, examples are used to further clarify the advantageous results of the invention. The invention is not limited to the following embodiments, but can be implemented with appropriate modifications made, within the range in which there is no change to the gist of the invention.

Comparison Example

In the comparison example, a vacuum chamber in which a glass substrate for an HD was mounted was evacuated in advance to $1.0 \times 10^{-5}$ Pa or less. As the glass substrate, crystallized glass the components of which were $Li_2Si_2O_5$, $Al_2O_3$—$K_2O$, $Al_2O_3$—$K_2O$, $MgO$—$P_2O_5$, and $Sb_2O_3$—$ZnO$, machined into a donut-shaped disc with outer diameter 65 mm and inner diameter 20 mm, was used. The surface roughness (Ra) of the glass substrate was 2 Å.

Next, the DC sputtering method was used to deposit in order on this glass substrate a soft magnetic layer of FeCoB to a thickness of 600 Å, an Ru intermediate layer of thickness 100 Å, and a magnetic layer of a 70Co-5Cr-15Pt-10SiO₂ alloy to a thickness of 150 Å; after this, the P-CVD method was used to deposit a protective layer of C (carbon) to an average thickness of 4 nm, and finally a fluoride lubricant was applied.

Next, a magnetic pattern was formed by magnetic layer machining. That is, a thermosetting resin resist was applied, and after forming depressions and protrusions corresponding to the pattern, an ion beam method was used to implant $Ar^+$ atoms. The accelerating voltage of the ion beam, irradiation time, and other conditions are given in Table 1. The accelerating voltage was held constant at 50 keV.

EXAMPLES

Example 1

In Example 1, magnetic recording media was fabricated under conditions similar to those of the Comparison Example. However, when implanting atoms into the magnetic layer, atoms were implanted with a uniform distribution in the thickness direction of the magnetic layer. That is, Ar was used as the ions for implantation, and by ionizing the Ar with the different valences $Ar^+$, $Ar^{2+}$, $Ar^{3+}$, a distribution was imparted to the depth of implantation of the atoms in the magnetic layer. The ion beam accelerating voltage, irradiation time, and other conditions are shown in Table 1. The accelerating voltage was 30 keV.

Figure 3:
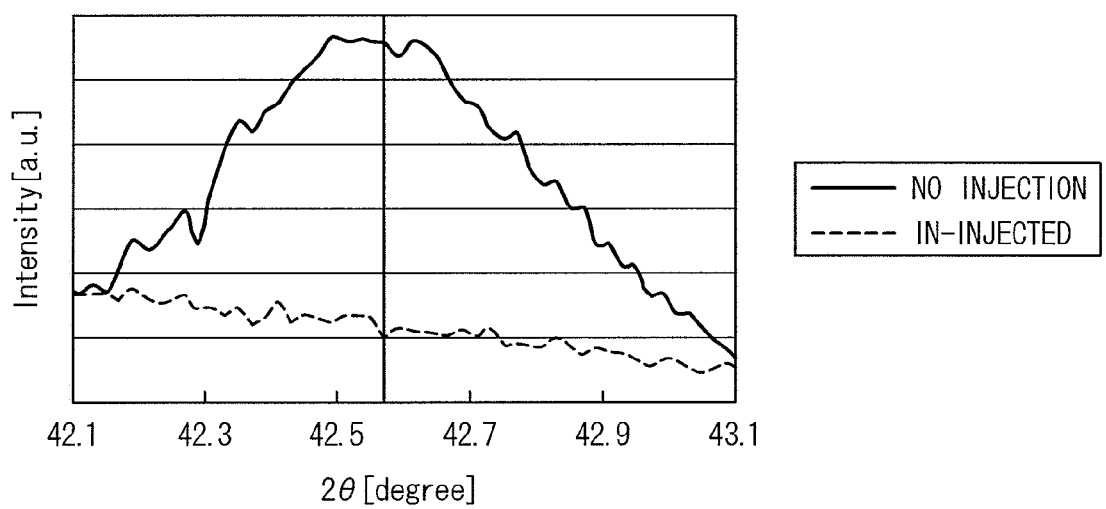
FIG. 3 is a characteristic graph showing a decline in the Co (002) or Co (110) X-ray diffraction peak due to implantation of In atoms into a magnetic layer.

The conditions of the ion beam implantation quantity and accelerating voltage must be set in advance through preliminary experiments. For example, when the Co (002) or Co (110) X-ray diffraction peak intensity of the magnetic layer is to be ½ or less, then as shown in FIG. 3, atom implantation is performed such that the diffraction peak for the magnetic layer becomes as indicated by the broken line. Further, the conditions for rendering the magnetic layer nonmagnetic and for amorphization of the magnetic layer must also be set in advance using X-ray diffraction measurements, electron beam diffraction measurements, and similar. In FIG. 3, the solid line indicates the state of a magnetic layer before implantation of In atoms, and the broken line indicates the state of the magnetic layer after implantation of In atoms.

Example 2

In Example 2, magnetic recording media was fabricated under conditions similar to those of the Comparison Example. However, when implanting atoms into the magnetic layer, a uniform distribution in the magnetic layer thickness direction was imparted during atom implantation. That is, an ion beam method was used to implant $Ar^+$ atoms into the magnetic layer at three different accelerating voltages. The ion beam accelerating voltages, irradiation time and other conditions appear in Table 1. The three accelerating voltages were used in the order 20 keV, 30 keV, 60 keV.

Example 3

In Example 3, magnetic recording media was fabricated under conditions similar to those of the Comparison Example. However, when implanting atoms into the magnetic layer, a uniform distribution in the magnetic layer thickness direction was imparted during atom implantation. That is, as the implantation ions, three types of ions were used, which were $Ar^+$, $Kr^+$, $Xe^+$; the accelerating voltage was fixed at 50 keV. The ion beam accelerating voltage, irradiation time and other conditions appear in Table 1.

Evaluations of electromagnetic transducing characteristics were performed using a spin stand for the Comparison Example and for Example 1 through 3. Specifically, a perpendicular recording head for recording and a TuMR head for reproduction were used as magnetic heads for evaluations, and the SNR value and 3T-squash were measured when signals were recorded at 750 kFCI. The measurement results appear in Table 1.

TABLE 1

| | Voltage/ irradiation time | SNR (dB) | 3T-squash (%) | Ra (nm) | Glide avalanche (nm) | Implanted atom concentration (%) |
|---|---|---|---|---|---|---|
| Comparison example | 50 keV/ 300 sec | 11.8 | 81.1 | 0.5 | 5.8 | 200 |
| Example 1 | 30 keV/ 180 sec | 13.1 | 84.1 | 0.3 | 5.5 | 115 |
| Example 2 | 20 keV/ 60 sec 30 keV/ | 13.2 | 84.4 | 0.8 | 6.9 | 110 |

TABLE 1-continued

|  | Voltage/<br>irradia-<br>tion<br>time | SNR<br>(dB) | 3T-<br>squash<br>(%) | Ra<br>(nm) | Glide<br>ava-<br>lanche<br>(nm) | Implanted<br>atom<br>concentration<br>(%) |
|---|---|---|---|---|---|---|
| Example 3 | 60 sec<br>60 keV/<br>60 sec<br>50 keV/<br>180 sec | 12.9 | 83.2 | 0.7 | 6.1 | 120 |

As shown in Table 1, compared with the Comparison Example, the SNR and 3T-squash values, which are RW characteristics, for Examples 1 through 3 are greatly improved. This is attributed to the complete disappearance of a magnetization state in the areas between magnetic tracks.

Also, SIMS was used to investigate the implanted atom concentration distribution in the magnetic layers of the magnetic recording media fabricated in the Comparison Example and in Examples 1 through 3; Table 1 presents results for the ratio of the maximum concentration to the average value of the concentration of implanted atoms in the magnetic layer, obtained from the measurement results.

INDUSTRIAL APPLICABILITY

By means of this invention, magnetic recording media can be provided which enables maintenance of head flight stability, affords excellent separation of magnetic patterns, is not affected by signal interference between adjacent magnetic patterns, and which has excellent high-density recording characteristics. Further, a method of manufacturing magnetic recording media which contributes to greatly improved productivity is provided. And, a magnetic recording/reproduction device which is not affected by signal interference between adjacent magnetic patterns or by write bleeding, and which offers excellent high-density recording characteristic, is provided.

What is claimed is:

1. A method of manufacturing magnetic recording media in which a magnetic layer is provided on at least one surface of a nonmagnetic substrate and a magnetically separated magnetic pattern is formed in the magnetic layer, comprising:
   implanting a plurality of atoms in the form of ions, each having a different energy, in said magnetic layer with uniform distribution in the magnetic layer thickness direction, said atoms being one or more of the atoms selected from the group consisting of: B, P, Si, F, H, C, In, Bi, Kr, Ar, Xe, W, As, Ge, Mo, Sn,
   partially amorphizing said magnetic layer to render portions of said magnetic layer nonmagnetic, so that nonmagnetic portions are formed which magnetically separate said magnetic pattern, thereby preventing recrystallization, caused by heat, of the amorphized portion of said magnetic layer
   wherein said magnetic layer comprises Co, and the Co (002) or Co (110) X-ray diffraction peak intensity of said nonmagnetic portion is ½ or less of the peak intensity of the magnetic layer before implantation of atoms.

2. The method of manufacturing magnetic recording media according to claim 1, wherein said atoms are Kr or Si.

3. The method of manufacturing magnetic recording media according to claim 1, wherein the surface roughness of said nonmagnetic substrate is such that the center line average roughness Ra is within the range: $0.1 \text{ nm} \leq Ra \leq 2.0 \text{ nm}$.

4. The method of manufacturing magnetic recording media according to claim 1, wherein after forming a protective film layer on said magnetic layer, said atoms are implanted.

* * * * *